Patented Oct. 28, 1941

2,260,303

UNITED STATES PATENT OFFICE 2,260,303

OIL ADDITION AGENTS

Ernest Frederic Engelke, Merchantville, N. J., assignor to Cities Service Oil Company, New York, N. Y., a corporation of Pennsylvania No Drawing. Application May 8, 1939, Serial No. 272,489

11 Claims. (Cl. 252—48)

This invention relates to new oil addition agents and compositions for use in the arts, and more particularly to such new agents and compositions comprising certain phosphorus organic materials especially adapted for use as lubricants generally, and for manufacturing various products in which a film strength agent or oil improvement agent is necessary or desirable.

A number of organic phosphorus compounds have been proposed for use in lubricating oils, particularly to increase the load-carrying capacity of the oils, and for certain other purposes, as described for example, in Klemgard's "Lubricating Greases: Their Manufacture and Use," pages 748 to 751, published in 1937. Moran et al. in U. S. Patents Nos. 2,058,342 to 4, has proposed the use of certain phosphites in corrosive lubricating oils, to prevent corrosion of certain types of bearings. Other patents have described the addition of certain other phosphorus organic compounds to lubricating oils.

The primary object of the present invention is to provide new and useful phosphorus organic compositions which are stable and which maintain a very tenacious film on the part or parts to be lubricated.

Another object of the invention is to provide an improved phosphorus organic composition as an addition agent which can be used in relatively small proportions in lubricating and other oil products to improve such products, and which will provide a lubricating film under conditions where such film could not be maintained by the products to which the composition is added.

Accordingly, the present invention contemplates an improved composition adapted for use as an addition material such as a film strength agent and comprising a phosphorus condensation product produced by a condensation reaction which includes the sulphurization of a quantity of phosphine under certain preferred conditions. The sulphurized condensation product formed in accordance with the present invention may be used alone as a film strength agent or mixed with any grade of lubricating oil, hydrocarbon, mineral oil or oily or grease compositions. The phosphines used in preparing the condensation product of the present invention may be primary or secondary, but are preferably the symmetrical tertiary phosphines in which three organic groups are attached to phosphorus. These groups or radicals each of which may be represented by (R) or (RO), may be aliphatic, aromatic, mixed aromatic and aliphatic, heterocyclic or hydroaromatic groups. The "R" groups in any phosphine may be alike or different, but in general the O-phosphines are preferred, such as tricresol-O-phosphine, $(RO)_3P$. One or more of the "R" groups in the phosphine may be halogenated. In fact, it has been found that the halogenated phenolic phosphines produce a much more effective film strength agent than the unhalogenated compounds. Like or unlike phosphines may be condensed.

The effectiveness of the improved condensation products of the present invention as film strength agents for example, may be illustrated by referring to the following specific examples, in which the percentages given are by weight.

Example I

The film strength agent used in this example was made by taking a quantity of tri-orthocresol-O-phosphine, $(CH_3.H_4C_6O)_3P$, and adding to it one half the atomic equivalent of flowers of sulfur. The resulting mixture was heated to a temperature of from 370° to 380° F. where an exothermic reaction takes place, by which, according to tests which have been made, a sulphurized condensation product is formed in which the sulfur is directly attached to phosphorus. The particular manner in which the phosphine molecules are condensed is not known, but they are believed to be condensed on a sulfur atom to form a sulfide containing at least two of the phosphine groups. The sulfur may act as a condensing agent.

The sulfide condensation product produced by the foregoing procedure was mixed with 20 S. A. E. lubricating oil in the proportion of 1% of the condensation product. This mixture may be made while the film strength agent is still hot after the condensation reaction. This oil product had a load-carrying capacity of 12,500 lbs. per square inch on the Timken lubricant testing machine, whereas the original oil had only 7,800 lbs. Sulfur condensation products of the type described above have also been made from meta and para cresol-O-phosphines, but have slightly lower load-carrying capacity than that made from the ortho compound.

Example II

The condensation product used in accordance with this example was made by reacting a quantity of tricresol-O-phosphine in the presence of an atomic equivalent of sulfur at a temperature of from 370° to 400° F. An exothermic reaction was observed, but any rise of temperature above 400° F. was prevented. The resulting condensation product contains relatively large molecular combinations of at least two molecules of the phosphine, with sulfur directly attached to phosphorus.

The condensation product made in accordance with this example was dissolved in 20 S. A. E. lubricating oil stock in the proportion of 1% to give a lubricant composition having excellent load-carrying qualities. This product showed a load-carrying capacity of 25,500 lbs. per square inch on the Timken testing machine.

*Example III*

The condensation product used in accordance with this example was made in somewhat the same manner as those of Examples I and II, but a greater proportion of sulfur was employed. Accordingly, a quantity of tri-ortho cresol-O-phosphine was mixed with one and one-half atomic equivalents of flowers of sulfur, and reacted at a temperature of from 400° to 415° F. Here again the reaction was exothermic and a very heavy product produced. At minus 10° F. the product was a stiff, clear, gel, but at higher temperatures it blends directly with mineral oils. Three tenths of 1% of the condensation product was blended with 20 S.A.E. lubricating oil stock to give a lubricant which showed a load-carrying capacity of 18,300 lbs. per square inch on the Timken testing machine. When 1% of the condensation product was used, the load-carrying capacity was considerably above that of the lubricant prepared in accordance with Example II.

The proportion of the product used in oily compositions may vary from 0.25% to 5%, but about 0.5 to 1.5% is preferred for most purposes.

An attempt was made to form condensation products containing greater proportions of sulfur, but, with the general procedure employed, it was found impossible to make a product containing a greater proportion of sulfur than three atomic equivalents of sulfur to two molecules of the phosphine. In each case, the excess sulfur could be crystallized out by chilling the reaction mixture to 10° F. and allowing it to stand. However, when an excess of sulfur was employed above the proportion referred to, only the excess could be crystallized out.

The structure of the condensation products produced in accordance with the present invention is not known, but they appear to be compounds containing at least two molecules of the phosphine derivative in which the phosphorus atoms are combined with sulfur and/or each other in a complex polycompound. The condensation reactions may involve interoxidation reduction reactions between the phosphorus atoms of the phosphines and the sulfur atoms. Various theories and structural formulae might be suggested as to the actual condensation products formed in view of various tests and analyses made on the reaction products described in the foregoing examples, but such theories are not regarded as of any importance to the invention.

In the place of tri-ortho-cresol-O-phosphine, phosphines prepared from commercial phenol mixtures such as termed "mixed cresols" containing ortho, meta and para cresols in varying proportions, or commercial cresylic acid which also contains, besides the isomeric cresols, several or all of the isomeric xylenols although in much smaller proportions, may be used. The O-phosphines prepared from these raw materials and sulphurized by the procedure given in the examples, gave film strength agents having load-carrying capacities varying between 20,000 to 32,000 lbs. per square inch.

The preferred addition agent in accordance with the present invention is that produced by the proportions of phosphine and sulfur used in Example I. This agent appears to have an unusual corrosion inhibiting action as well as a relatively high load-carrying capacity. The proportions of sulfur and phosphine used in accordance with Example I may be varied from one to eight atoms of sulfur to ten molecules of the phosphine. Where, however, the load-carrying capacity of the lubricant to be made is of primary importance, the sulfur condensation product is preferably made in accordance with Example III, so that the proportion of sulfur in the compound, to phosphorus, is as great as possible.

The organic phosphine used for making the condensation product in accordance with the present invention is preferably one in which the organic radical (R) is attached to phosphorus through oxygen (RO) and contains an aromatic or cyclic hydrocarbon group such as the benzene ring; also one in which the organic radical contains one or more halogen atoms such for example as chlorine.

While certain organic phosphites have been suggested by others as corrosion inhibitors in lubricating oils, repeated tests have shown that the phosphine sulfide condensation product formed in accordance with Example I is even more effective as a corrosion inhibitor. For example, the loss by corrosion of a Pennsylvania S.A.E. 20 mineral oil on a cadmium-copper silver bearing was 6.2 mgms., while the same oil containing only 0.25% of the condensation product of Example I showed a loss of only 0.5 mgm. In a comparative test, the same sample containing tricresol phosphite showed a loss of 1.6 mgms.

While the foregoing examples in illustrating the application of the improved compositions relate primarily to the use of the compositions in mineral oils, it is to be understood that the invention contemplates their use as such for all purposes to which they are adapted, for example in cutting oils and in lubricants for the lubrication of bearings and cylinder wall surfaces of internal combustion engines. The compositions may also be used as antioxidants; as an anti-rust agent, and as a film strength agent in greases and for blending with fatty oils, synthetic oils and esters, or used alone as film strength agents for any desired use where the maintenance of a surface film between moving parts of a mechanism is essential. The improved composition of the present invention has been found to be particularly useful in the crank case of an automobile, since in a lubricant vehicle the material maintains a relatively clear oil over substantially long periods of use. The composition has also been found of particular advantage in the removal of old resinous deposits from the parts of the motor. The composition is an effective constituent therefor of a crank case flushing composition, not only because it helps to dissolve the resinous constituents in the motor and crank case, but because it provides an effective lubricant in light oil solvents or mixtures, so that the motor may be operated for a substantial period of time while the crank case is being flushed. A suitable flushing mixture may contain from 1% to 5% of the phosphine condensation product dissolved in relatively large proportions of light oils such as kerosene, light furnace oil and light cold tar distillates or mixtures of these oils.

The condensation product of the present invention may be used as a top cylinder lubricant in an internal combustion engine by adding approximately 1% by volume of the product to the motor fuel to be used in the engine. The improved product or products of the present invention may be employed for other purposes as will be apparent to those skilled in the art.

Having thus described the invention in its preferred form, what is claimed as new is:

1. A lubricant comprising a hydrocarbon oil and a condensation product of an organic phosphine formed in the presence of sulfur and containing at least two organic phosphine radicals in the molecule.

2. A lubricant comprising a hydrocarbon oil and approximately 1% of a condensation product of organic phosphine molecules with sulfur.

3. The method of increasing the load-carrying capacity of a lubricating medium, which comprises blending with said medium a relatively small proportion of an organic phosphine condensation product containing chemically combined sulfur, said product being formed by condensing organic phosphine groups in the presence of sulfur.

4. A composition having a high film strength comprising an oil and a small proportion of a product of a condensing reaction between organic phosphine molecules carried out in the presence of sulfur under conditions adapted to condense such molecules.

5. A hydrocarbon oil composition comprising a relatively large proportion of a refined hydrocarbon oil of relatively low film strength in intimate admixture with a relatively small proportion, sufficient to impart a relatively high film strength to said composition, of a condensation reaction product of tricresol-O-phosphine molecules, said product being further characterized by containing sulfur attached to phosphorus.

6. A lubricant comprising a hydrocarbon oil and a relatively small proportion of a condensation product containing combined phosphine groups resulting from the reaction of sulfur with a tertiary organic phosphine under condensing conditions.

7. A lubricant comprising a hydrocarbon oil and a relatively small proportion of a halogenated organic phosphine sulfide condensation product containing molecules in which at least two phosphine groups are chemically joined.

8. A composition comprising a relatively large proportion of oily material and a relatively small proportion of an extreme pressure lubricating agent in which at least two organic phosphine groups are chemically combined through a sulfur atom.

9. A composition comprising a relatively large proportion of oily material and a relatively small proportion of an extreme pressure lubricating agent in which at least two organic phosphine groups are chemically combined with each other and with sulfur.

10. A lubricant comprising a hydrocarbon oil and a relatively small proportion of a condensation product containing at least two organic phosphine radicals chemically combined to each other and to sulfur, sulfur being directly attached to phosphorus.

11. A lubricant comprising a hydrocarbon oil and a relatively small proportion of a halogenated organic phosphine sulfide condensation product containing at least two phosphine groups in which the organic groups are attached to phosphorus through oxygen, and in which sulfur is attached to phosphorus.

ERNEST FREDERIC ENGELKE.